United States Patent [19]

Geisthoff

[11] 4,265,327
[45] May 5, 1981

[54] RELEASE DEVICE

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 940,593

[22] Filed: Sep. 8, 1978

[30] Foreign Application Priority Data

Sep. 24, 1977 [DE] Fed. Rep. of Germany ....... 2743072

[51] Int. Cl.³ .............................................. B60K 25/00
[52] U.S. Cl. .................. 180/53 D; 180/14.5; 403/322
[58] Field of Search ................ 180/14 R, 14 B, 14.5, 180/53 R, 53 C, 53 D; 64/23, 4, 30 A, 29, DIG. 1; 74/11; 403/321, 322, 325; 280/446 R

[56] References Cited

U.S. PATENT DOCUMENTS

| 1,898,113 | 2/1933 | Zink | 180/14.5 |
| 2,808,119 | 10/1957 | Steinman | 180/14.5 |
| 3,070,393 | 12/1962 | Silverberg | 64/29 |
| 4,058,990 | 11/1977 | von Allwörden | 180/14 R |

*Primary Examiner*—John J. Love
*Assistant Examiner*—Randall A. Schrecengost
*Attorney, Agent, or Firm*—Toren, McGeady and Stanger

[57] ABSTRACT

A device for releasing a telescoping power take-off shaft from the power take-off on a tractor includes a traction member, such as a cable, secured at one end to an axially displaceable member forming part of the locking member for securing the shaft to the power take-off. The other end of the traction member is fixed to the shaft beyond the location at which it telescopes or it is fixed to the agricultural implement driven by the shaft. When the tractor is pulled away from the agricultural implement, after the drawbar connection between them is broken, the shaft becomes elongated and tensions the traction member causing the release of the locking member.

8 Claims, 4 Drawing Figures

RELEASE DEVICE

SUMMARY OF THE INVENTION

The present invention is directed to a device for releasing the locking ring of a coupling securing a telescoping power take-off shaft which is connected at one end to the power take-off of a tractor and at its other end to an agricultural implement.

When an agricultural implement, driven by a tractor over a telescoping power take-off shaft, disconnected from the tractor, it frequently happens that the drawbar is uncoupled, however, the disengagement of the shaft from the power take-off on the tractor is forgotten. In such an instance, the agricultural implement is frequently tipped over during a subsequent start-up of the tractor leading to frequent accidents or to damage to the telescoping shaft which is pulled away from the agricultural implement.

In the past there has been no known device for automatically uncoupling the telescoping shaft from the tractor power take-off after the tractor and the agricultural implement have been disconnected.

Therefore, it is the primary object of the present invention to provide a release device which affords a safety mechanism for releasing the locking engagement of the telescoping power take-off shaft with the tractor power take-off when the shaft is extended beyond a predetermined length. When additional axial elongation takes place in the shaft beyond its predetermined length the locking engagement of the shaft to the power take-off is released.

In accordance with the present invention, the locking member securing the shaft to the power take-off consists of a shift ring encircling an outer locking ring forming part of a snap-on connection. The shift ring is rotatable relative to the locking ring but conforms to axial movement. A traction member is secured at one end to the shift ring and at its other end to a point fixed relative to the connection of the shaft to the agricultural implement.

If the operator disengages the drawbar connection between the tractor and the implement and forgets to release the connection between the shaft and the tractor, by means of the release device of the present invention the locking engagement between the shaft and the tractor power take-off is automatically disengaged when the tractor is started up and moved away from the implement. When the tractor moves away from the implement, the telescoping power take-off shaft is extended by virtue of its length adjustment mechanism until the traction member is tensioned, since it is connected to a fixed point at its opposite end from the locking device. Upon further movement of the tractor away from the implement, the shift ring is displaced axially releasing the locking ring which moves into a released position permitting the disengagment of the locking device as the tractor continues to move away from the implement.

In another embodiment of the invention, the telescoping shaft is enclosed within a protective member, independent of the shaft, forming a duct within which the shaft is located. The protective member is also telescopically arranged and the locking device securing the shaft to the tractor power take-off is connected via the traction member which in turn is secured at its opposite end to a fixed location on the protective member. The traction member spans the telescoping portions of the protective member.

In this arrangement, the traction member can act directly on the locking ring during operation, since its other end is connected to a fixed point which also rotates during operation and is located on the opposite side of the telescoping portions of the protective member.

In still another embodiment of the invention the shaft includes an integral protective member with the traction member connected to the locking device at one end and to a fixed point at the other end on the opposite side of the protective member from its length adjustment portion.

There is the advantage in such an arrangement that the traction member is connected at its opposite ends only to parts of the telescoping shaft or, respectively, to the protective member enclosing the shaft, so that it is unnecessary to provide any fixed attachment to structure separate from the shaft. When the telescoping power take-off shaft is connected to an implement and a tractor, it is not necessary to adjust the length of the traction member to obtain the desired release point.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
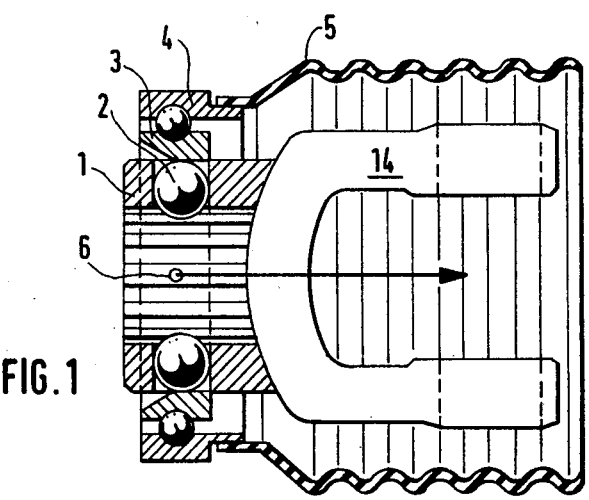
FIG. 1 is an axially extending sectional view of a release device embodying the present invention including a yoke mounting a snap-on connection with a shift ring positioned on a locking ring.
Figure 2:
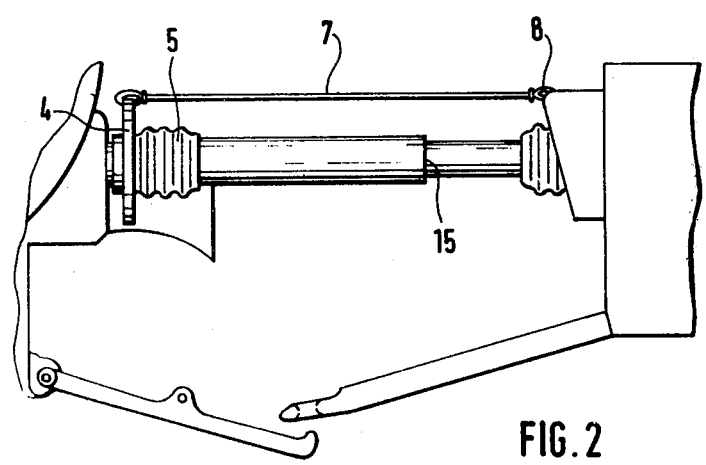
FIG. 2 is a side view of a telescoping power take-off shaft including a traction member in the form of a cable secured to a fixed location on the agricultural implement.
Figure 3:
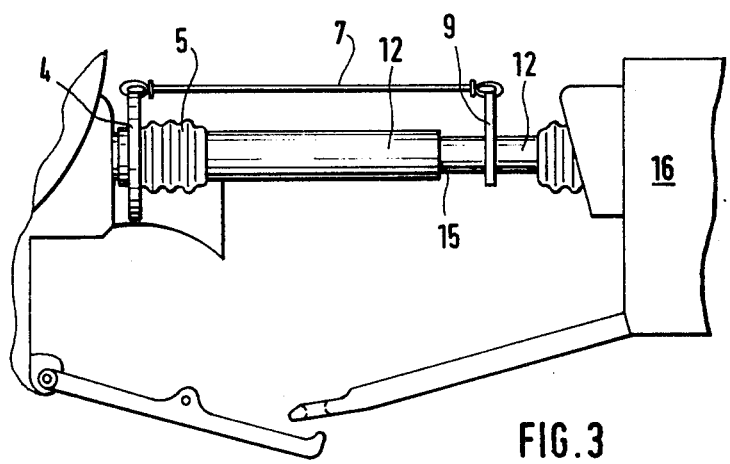
FIG. 3 is a view similar to FIG. 2 of a telescoping power take-off shaft including a traction member in the form of a cable connected to a fixed point on a protective member on the opposite side of its telescoping portion from the tractor.

As shown in FIG. 1, the locking member for securing a telescoping power take-off shaft to the power take-off on a tractor includes a coupling sleeve 1 secured to a yoke 14. The interior of the coupling sleeve is splined for engagement with the splined surface on the exterior of the tractor power take-off. A snap-on connection is incorporated with the coupling sleeve 1. The snap-on connection for effecting locking engagement between the telescoping shaft and the tractor power take-off consists of a number of balls 2 mounted in the coupling sleeve and serving as locking bodies. An outer locking ring 3 encircles the coupling sleeve 1 and holds the balls 2 in locking engagement. A shift ring 4 encircles and is mounted on the locking ring 3, shift ring 4 is rotatable relative to the locking ring 3. For purposes of this description the tractor to which the telescoping power take-off shaft is connected is considered forward of the agricultural implement secured to the opposite end of the shaft from the tractor. As shown in the combination of FIGS. 1 and 2, a traction connection 6 and a traction member 7 in the form of a cable interconnect the locking device and the agricultural implement to which the traction member is attached at a fixed point 8. In FIG. 3 the traction member 7 is secured to a fixed point on the protective member 12 about the shaft while in FIG. 4 the traction member consists of a pair of telescoping rods 10. As can be seen in these various FIGS., the point of fixed connection of the traction member is located on the opposite side of the telescoping portion of the shaft from the tractor. The telescoping portion 15 is shown in FIGS. 2 and 3.

In FIG. 2, a telescoping power take-off shaft connects the power take-off of the tractor to an agricultural implement. In this embodiment of the invention, the attachment of the shaft to the tractor is enclosed by a tubular shaped protective member 5. A traction cable 7 is secured at one end to an outwardly extending portion of the shift ring 4. At its opposite end, the traction cable 7 is secured to a fixed point 8 on the agricultural implement. As shown in FIG. 2, the drawbar connection between the tractor and the agricultural implement is disengaged while the telescoping shaft remains connected to the power take-off on the tractor. Due to the telescoping or length adjustment feature of the shaft it is possible to pull out the shaft if the tractor is moved forwardly away from the agricultural implement until the traction member or cable 7 is tensioned. At this point when the tractor is moved further away from the implement, the shift ring 4 including the locking ring 3 are pulled rearwardly and the snap-on connection is released and the coupling sleeve is removed from the power take-off on the tractor by means of the traction cable 7.

In FIG. 3 another embodiment of the released device is illustrated with the fixed connection 9 of the traction member 7 forming a part of the protective tube enclosing the telescoping shaft rather than being fixed directly to the implement. It can be noted that the fixed connection 9 is located on the opposite side of the length adjustment portion 15 from the tractor or the locking device. Since the protective tube or member 12 located rearwardly of the length adjustment portion 15 is fixed to the agricultural implement 16, the function of the release device is the same as described above.

Figure 4:
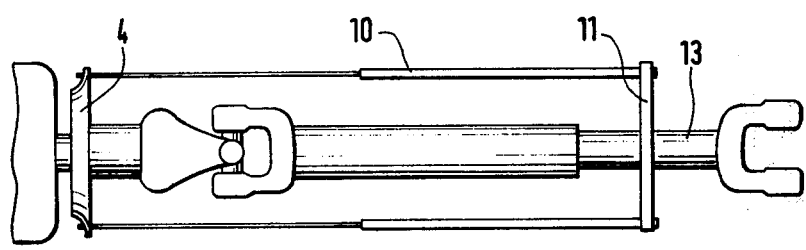
FIG. 4 is a view of a telescoping shaft having a protective member, not shown, not connected to the shaft and with the traction member formed by telescoping rods fixed at the ends spaced from the tractor to the shaft, that is, with the connection of the traction member being on the opposite side of the telescoping portion of the shaft from the tractor.

In FIG. 4 another arrangement of a telescoping power take-off shaft is shown coupled to a tractor. In this embodiment, the shaft is not enclosed by an integral protective member as is the case when a full protective member, not shown, is provided. In this arrangement, the traction member consists of two telescopic rods each secured at one end to the shift ring 4. The other ends of the telescopic rods 10 are connected to a bracket 11 which extends outwardly from the shaft 13 rearwardly from the telsecoping portion thereof. The disengagement of the locking device to the tractor functions in the same manner as described above. When the tractor is moved forwardly away from the agricultural implement, initially the telescoping portion 15 of the shaft is extended until the telescopic rods reach a maximum length. After this length has been reached any additional forward movement of the tractor moves the shift ring 4 and the locking ring 3 into the released position so that the coupling sleeve 1 can be removed from the tractor power take-off.

To ensure the operability of the release device of the present invention, the maximum length of the traction member 7, 10, must be adjusted so that it acts on the shift ring 4 before the telescoping portions of the shaft or of the protective member are completely pulled apart. Accordingly it is preferable to locate the rearward fixed point for the traction member on that part of the shaft 13 or of the protective member 12 located rearwardly of the telescoping portion 15. In such an arrangement, the maximum length of the traction member need only be adjusted once in accordance with the length of the telescoping shaft.

I claim:

1. A device for releasing a locked connection between a power take-off member and one of a tractor and an agricultural implement comprising an axially elongated telescoping power take-off shaft having a first end and a second end and being telescopable at a point intermediate the ends thereof, said first end arranged to be secured to one of the tractor and the agricultural implement, and means for releasably attaching said second end to the other one of the tractor and the agricultural implement, said means including a member displaceable in the axial direction of said shaft for releasing the attachment of said shaft, wherein the improvement comprises an elongated traction member extending in the axial direction of said shaft and having a first end and a second end with the first end secured to said displaceable member and the second end arranged to be fixed to one of the tractor and the agricultural implement to which the first end of said shaft is arranged to be secured and said shaft between the first end of said shaft and the point on said shaft at which telescoping takes place so that after the drawbar connection between the tractor and implement is disconnected any movement of the tractor away from the implement causes said traction member to be tensioned for effecting the displacement of said member and effecting the release of said means, said means releasably attaches said second end of said shaft to the tractor, said shaft comprises a pair of axially extending parts one telescoping into the other, a tubular protective member for each said part of said shaft, said tubular protective member being telescopable one into the other, and the second end of said traction member is fixed to the one of said protective members closer to the implement.

2. A device, as set forth in claim 1, wherein said traction member is a cable.

3. A device, as set forth in claim 1, wherein said means includes a coupling sleeve for interengagement with said power take-off member, a locking ring encircling said coupling sleeve, and said displaceable member is a shift ring encircling said locking ring and being rotatable relative to said locking ring.

4. A device for releasing a locked connection between a power take-off member and one of a tractor and an agricultural implement comprising an axially elongated telescoping power take-off shaft having a first end and a second end and being telescopable at a point intermediate the ends thereof, said first end arranged to be secured to one of the tractor and the agricultural implement, and means for releasably attaching said second end to the other one of the tractor and the agricultural implement, said means including a member displaceable in the axial direction of said shaft for releasing the attachment of said shaft, wherein the improvement comprises an elongated traction member extending in the axial direction of said shaft and having a first end and a second end with the first end secured to said displaceable member and the second end arranged to be fixed to one of the tractor and the agricultural implement to which the first end of said shaft is arranged to be secured and said shaft between the first end of said shaft and the point on said shaft at which telescoping takes place so that after the drawbar connection between the tractor and implement is disconnected any movement of the tractor away from the implement causes said traction member to be tensioned for effecting the displacement of said member and effecting the release of said means, and said traction member is a pair of laterally spaced telescoping rods.

5. In an agricultural equipment assembly comprising a tractor having a power take-off, an agricultural implement, an axially elongated telescoping power take-off shaft secured to said implement, means for releasably attaching said shaft to the power take-off on said tractor, said means including a member displaceable in the axial direction of said shaft for releasing the attachment of said shaft to said tractor power take-off, the improvement comprising an axially elongated traction member extending in the same direction as said shaft, said traction member having one end secured to said member and the other end fixed to one of said agricultural implement and said shaft between said agricultural implement and the point where the shaft telescopes, said shaft is enclosed within a telescoping tubular protective member having a first part enclosing said shaft closer to said implement and a second part enclosing said shaft closer to said tractor, said traction member comprises an elongated cable secured at the one end thereof to said member and at the other end thereof to said first part of said protective member.

6. In an agricultural equipment assembly comprising a tractor having a power take-off, an agricultural implement, an axially elongated telescoping power take-off shaft secured to said implement, means for releasably attaching said shaft to the power take-off on said tractor, said means including a member displaceable in the axial direction of said shaft for releasing the attachment of said shaft to said tractor power take-off, the improvement comprising an axially elongated traction member extending in the same direction as said shaft, said traction member having one end secured to said member and the other end fixed to one of said agricultural implement and said shaft between said agricultural implement and the point where the shaft telescopes, and said traction member comprises a pair of laterally spaced elongated telescoping rods, and each of said rods secured at one end to said member and at the other end to said shaft intermediate said implement and the point where said shaft telescopes.

7. In an agricultural equipment assembly, as set forth in claims 5 or 6, wherein said power take-off on said tractor is splined, said means includes a coupling sleeve splined for interengagement with the splined said take-off, a locking ring encircling said coupling member, and said member is a shift ring encircling said locking ring and being rotatable relative to said locking ring.

8. In an agricultural equipment assembly comprising a tractor having a power take-off, an agricultural implement, an axially elongated telescoping power take-off shaft secured to said implement, for releasably attaching said shaft to the power take-off on said tractor, said means including a member displaceable in the axial direction of said shaft for releasing the attachment of said shaft to said tractor power take-off, the improvement comprising an axially elongated traction member extending in the same direction as said shaft, said traction member having one end secured to said member and the other end fixed to one of said agricultural implement and said shaft between said agricultural implement and the point where the shaft telescopes, said power take-off on said tractor is splined, said means includes a coupling sleeve splined for interengagement with the splined said power take-off, a locking ring encircling said coupling sleeve, and said member is a shift ring encircling said locking ring and being rotatable relative thereto.

* * * * *